(12) United States Patent
Banerjee

(10) Patent No.: US 9,698,726 B2
(45) Date of Patent: Jul. 4, 2017

(54) SOLAR PANEL EFFICACY-METHOD AND DEVICE

(71) Applicant: Banmali Banerjee, Edison, NJ (US)

(72) Inventor: Banmali Banerjee, Edison, NJ (US)

( * ) Notice: Subject to any disclaimer, the term of this patent is extended or adjusted under 35 U.S.C. 154(b) by 0 days.

(21) Appl. No.: 14/753,347

(22) Filed: Jun. 29, 2015

(65) Prior Publication Data

US 2016/0380583 A1 Dec. 29, 2016

(51) Int. Cl.
*H02S 10/30* (2014.01)
*H02S 40/22* (2014.01)
*H02S 40/44* (2014.01)
*F24J 2/06* (2006.01)

(52) U.S. Cl.
CPC ............... *H02S 40/44* (2014.12); *F24J 2/06* (2013.01); *H02S 10/30* (2014.12); *H02S 40/22* (2014.12)

(58) Field of Classification Search
CPC .......... H02S 40/22; H02S 40/40; H02S 40/42; H02S 40/44; H02S 10/30; H01L 31/0547
See application file for complete search history.

(56) References Cited

U.S. PATENT DOCUMENTS

| | | | |
|---|---|---|---|
| 3,841,738 A | 10/1974 | Caplan | |
| 4,135,493 A | 1/1979 | Kennedy | |
| 4,153,474 A * | 5/1979 | Rex | H01L 31/0547 136/246 |
| 4,173,213 A | 11/1979 | Kelly | |

(Continued)

FOREIGN PATENT DOCUMENTS

| | | | |
|---|---|---|---|
| JP | WO 2013099370 A1 * | 7/2013 | ............ F03G 6/001 |
| MX | WO 2013141683 A1 * | 9/2013 | ............ F24J 2/1057 |
| WO | 2007/142515 A1 | 12/2007 | |

OTHER PUBLICATIONS

Wang, et al., "A theoretical investigation of the laser damage threshold of metal multi-dielectric mirrors for high power ultrashort applications." Optics express 21.12 (2013): 14698-14711.*

(Continued)

*Primary Examiner* — Allison Bourke
*Assistant Examiner* — William E McClain
(74) *Attorney, Agent, or Firm* — Michael J. Feigin, Esq.; Feigin & Fridman LLC

(57) ABSTRACT

The disclosed technology describes methods and devices for generating electricity and heat using a parabolic solar panel which employs photo-voltaic and photo-thermal technology. Embodiments include forming a flexible substrate into a parabola. A plurality of flexible photo-voltaic cells is disposed in a grid pattern over the interior surface of the parabola. Photo-reflective mirrors are disposed on the parabola's interior surface in areas not occupied by photo-voltaic cells. A copper pipe is positioned to coincide with the parabola's focal line, so that light rays reflected off the parabola are focused on the copper pipe. Inflow and outflow tubes are attached to opposite ends of the copper pipe. Water or other heat absorbing liquid is circulated through the copper pipe where the liquid absorbs thermal energy of the sunrays reflected from the photo-reflective mirrors. The liquid can be directed to a device which converts the liquid's thermal energy to electricity. Electricity produced by the photo-voltaic cells is stored in a battery.

9 Claims, 6 Drawing Sheets

(56) References Cited

U.S. PATENT DOCUMENTS

| | | | |
|---|---|---|---|
| 6,177,627 B1* | 1/2001 | Murphy | F24J 2/10 |
| | | | 136/245 |
| 8,607,510 B2 | 12/2013 | Daniels | |
| 2007/0137640 A1* | 6/2007 | Tarabishi | F24J 2/08 |
| | | | 126/577 |
| 2014/0153122 A1 | 6/2014 | Wang et al. | |
| 2014/0271382 A1 | 9/2014 | Gonzalez | |
| 2014/0352759 A1* | 12/2014 | Barnes | H01L 31/0525 |
| | | | 136/246 |
| 2014/0360561 A1* | 12/2014 | Meyer | H02S 40/22 |
| | | | 136/251 |
| 2015/0083194 A1* | 3/2015 | Matsushima | F24J 2/1057 |
| | | | 136/248 |
| 2015/0122309 A1* | 5/2015 | Agraz Huitron | F24J 2/1057 |
| | | | 136/248 |

OTHER PUBLICATIONS

Rollable Solar Panels, www.powerfilmsolar.com Accessed on Jan. 28, 2015.

* cited by examiner

SOLAR PANEL EFFICACY-METHOD AND DEVICE

FIELD OF THE DISCLOSED TECHNOLOGY

The disclosed technology relates generally to a method and device for generating electricity and heat, and more specifically to use of parabolic solar panel which employs photo-voltaic and photo-thermal technology.

BACKGROUND OF THE DISCLOSED TECHNOLOGY

Price fluctuations, limited supply, unreliable distribution systems, and harmful by-products of combustion to humans and the environment, are drawbacks of fossil fuels. Hence it is imperative that society develop more efficient, reliable, sustainable, and cleaner sources of energy. One renewable, sustainable, and clean form of energy is solar power. Photo-thermal panels and photo-voltaic panels which produce heat and electricity, respectively, using the sun's rays exist in the art. However, a deficiency in these systems is that they lack efficiency. Small villages in many countries do not get electricity and hot water. Also, the limited area on roof tops in houses limits the use of many panels. The high cost to area ratio and high cost of solar installation prohibit the use of solar electrical systems and solar water heating systems separately. One method of increasing the efficiency of currently available solar panels is to maximize the use of a panel's surface area that is devoted to energy production. In other words, making the panel more space efficient and reduce "wasted" and unproductive areas on the panel's surface. Another method is to change the shape of the solar panel for improving both, the efficiency of solar energy collection and improving the space efficiency of installation

SUMMARY OF THE DISCLOSED TECHNOLOGY

The method and device in the disclosed technology meet an existing need, as the technology offers a more efficient means of converting sustainable and clean solar energy into electric power. The disclosed technology includes a photo-voltaic and photo-thermal electrical generation device. A flexible substrate, possessing a line of symmetry, is formed in the shape of a parabola in a manner in which the vertices of the parabola coincide with said line of symmetry. The flexible substrate contains a plurality of flexible photo-voltaic cells disposed in a grid pattern over an interior surface of said parabola. A plurality of photo-reflective mirrors is disposed over the interior surface of the parabola in areas unoccupied by photo-voltaic cells. A mirror is defined in this specification as material with a solar reflectance of at least 75%. The non-mirrored portion of the parabola has a solar reflectance of 50% or less. Solar reflectance is defined as the percentage of natural light incident upon a surface that is reflected. A pipe, used to carry fluid to be heated, is positioned across the center of the parabola perpendicular to the curvature of the parabola and along the parabola's focal line. An inflow tube is fixedly attached to one end of said pipe and an outflow tube fixedly attached to the other end of said pipe, wherein both attachments form a watertight connection. "Tube" is defined in this specification as a "pipe," "conduit," "hose," or other liquid impermeable channel through which a liquid may flow without leakage.

In many embodiments of the device the flexible substrate is formed in a three dimensional parabola (paraboloid) of conical, circular, rectangular, square, or any other three dimensional polygonal shape of at least four sides. A plurality of flexible photo-voltaic cells is disposed in a grid pattern over the interior surface of the parabola. A plurality of photo-reflective mirrors is disposed over the interior surface of the paraboloid in areas unoccupied by photo-voltaic cells. A pipe with an elongated length thereof is positioned to pass through the focal line of said parabola of polygonal shape, whereas a container, other than a pipe, is positioned at the focal point of parabolic cone or circular paraboloid. The pipe or the container should be of copper, because copper is widely used as the most economical heat conductor. An inflow tube is fixedly attached to one end of said pipe or container and an outflow tube fixedly attached to the other end of said pipe or container, wherein both attachments form a watertight connection.

The disclosed technology also includes a method of generating electricity and heat using a combined photo-voltaic and photo-thermal power generation device comprising the steps of forming a flexible substrate, through which a line of symmetry can be drawn. The flexible substrate may be shaped into a parabola, wherein the vertices of said parabola coincide with a line of symmetry. A plurality of flexible photo-voltaic cells is disposed in a grid pattern over the interior surface of said parabola. A plurality of photo-reflective mirrors is disposed over the interior surface of the parabola in areas between the photo-voltaic cells and areas unoccupied by photo-voltaic cells. A pipe is positioned across the center of the parabola perpendicular to the curvature of the parabola and along the parabola's focal line. An inflow tube is fixedly attached to one end of the pipe, running across the center of the parabola, forming a watertight connection. An outflow tube is fixedly attached to the other end of said pipe, running across the center of the parabola, forming a watertight connection.

"Substantially" and "substantially shown," for purposes of this specification, are defined as "at least 90%," or as otherwise indicated. Any device may "comprise" or "consist of" the devices mentioned there-in, as limited by the claims. "Generally" for purposes of this specification, is defined as "at least 75%," or as otherwise indicated.

It should be understood that the use of "and/or" is defined inclusively such that the term "a and/or b" should be read to include the sets: "a and b," "a or b," or "a," "b."

DETAILED DESCRIPTION OF EMBODIMENTS OF THE DISCLOSED TECHNOLOGY

Figure 1:
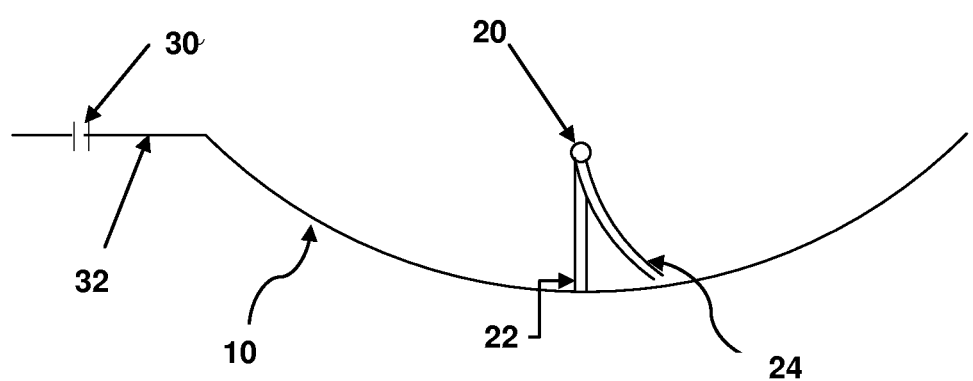
FIG. 1 shows a front elevation cross-sectional view of a parabolic photo-voltaic cell panel.

The disclosed technology includes a photo-voltaic and photo-thermal power generation device. A flexible substrate is formed into the shape of a parabola. The flexible substrate may be composed of aluminum; another weather resistant metal or metal alloy, such as stainless steel; or other weather resistant material such as plastic or vinyl. "Weather resistant" is defined in this specification as any material that does not substantially corrode, degrade, deteriorate, oxidize, rust, or denature when used in an application outside of a structure that shields the material from weather or when exposed to various climatological conditions.

In an embodiment the flexible substrate has the shape of a rectangle; square; polygon with an even number of sides; or any geometric form; through which a line of symmetry may be drawn. The flexible substrate is curved in a manner so that the parabola's X and Z coordinates are identical along its Y axis and the vertices of the parabola coincide with a line of symmetry, wherein the vertices of the parabola constitute the lowest points of the parabola on the Y axis and the vertices have the same X coordinates. "Line of symmetry" is defined as a line through a geometric shape wherein the halves of the geometric shape on opposite sides of the line of symmetry are mirror images.

In another embodiment, the flexible substrate may be formed into a cone, hemisphere, or other curved three dimensional shapes with an open end, in a manner in which each plane of the flexible substrate's curve that are perpendicular to its Y-axis, through the center point of the panel, forms a parabola. Center point is defined as the point at the vertex of a cone, hemisphere, or other curved three dimensional shapes which forms the flexible substrate.

In embodiments of the disclosed technology the flexible substrate includes a plurality of flexible photo-voltaic cells disposed in a grid pattern over an interior surface of the parabola, forming the photo-voltaic panel. The terms "solar panel", "panel", "photo-voltaic cell panel", and "photo-voltaic panel" are used interchangeably in this specification and are defined as "a device which absorbs light energy and outputs electrical energy." "Grid pattern" is defined as an assembly of separate photo-voltaic cells, spaced apart, in rows and columns in which the sides of a photo-voltaic cell align with the corresponding sides of every photo-voltaic cell in that photo-voltaic cell's column or row. "Column" is defined in this specification as an area with straight left and right margins, wherein the space between the right and left margins is uniform and the margins are parallel to the Y axis in a Cartesian coordinate system. "Row" is defined in this specification as an area with straight top and bottom margins, wherein the space between the top and bottom margins is uniform and the top and bottom margins are parallel with the X axis in a Cartesian coordinate system. "Interior" as used in this specification refers to the inner surface (concave side) of the curved solar panel or curved substrate on which the panel is situated. A plurality of photo-reflective mirrors is disposed over the interior surface of the photo-voltaic panel in areas between the photo-voltaic cells or areas unoccupied by a photo-voltaic cell.

A pipe, for example, one made of copper, is positioned across the center of the parabolic solar panel. In embodiments where the panel is in the shape of a rectangle, square, or polygon of at least four sides, the copper pipe is disposed perpendicular to the curvature of the parabola and along the parabola's focal line. Focal line is defined as the line through which light rays falling on the panel will pass after reflection from the panel, irrespective of the angle of incidence. In embodiments where the solar panel comprises a cone, hemisphere, or other curved three dimensional shape where the panel's X and Y coordinates change along the Z axis, the copper container, such as a pipe, is positioned so that the focal point of the parabola falls on the copper container. Focal point is defined as the point through which light rays falling on a solar panel, comprising a cone, hemisphere, or other curved three dimensional shape, passes irrespective of angle of incidence. In some embodiments the copper container can be composed of another metal or metal alloy, such as iron or stainless steel, or suitable liquid impermeable, heat conducting material.

In embodiments where the panel is in the shape of a rectangle, square, or polygon of at least four sides, the copper pipe is fixedly attached to two steel rods, each of which is, in turn, fixedly attached to a point on the center line of the panel. "Center line" is defined as the line of symmetry located at the bottom of the panel, perpendicular to the line of vertices or Y-axis of the parabola. "Rod" is defined as any linear member such as a bar, pole or support. The rods are located on opposite sides of the mid-point of the center line and each is located on the center line between the edge-point of the panel and the solar cell closest to the edge of the panel, in other words, in the area unoccupied by either solar cells or mirrors. "Edge-point" is defined as a point on the perimeter of the panel through which the center line passes. In some embodiments the rods may be composed of suitable material that can provide appropriate physical support and is weather resistant, including a metal, such as aluminum; metal alloy, such as stainless steel; or other weather resistant material such as plastic or vinyl. The copper pipe is positioned to coincide with the focal line of the panel so that the light rays reflected off the parabola are focused on the copper pipe.

In embodiments where the solar panel comprises a parabolic cone, hemisphere, or other curved three dimensional shape wherein the panel's X and Y coordinates change along the Z axis, the container carrying fluid to be heated may be fixedly attached by said two or more steel rods, each of which, in turn, may be fixedly attached to a perimeter edge of the panel's opening or other suitable location on the panel's interior surface which provides adequate support for the container. "Adequate support" is defined in this specification as sufficient support to maintain the container in a stable and fixed position under most weather and climatological conditions. "Most" is defined in this specification as in more than 50%. Said steel rods position the said container on the focal point of the panel so that the light rays reflected off the parabola are focused on the container.

In embodiments where the flexible parabolic solar panel is in the shape of a rectangle, square, or polygon of an even number of sides, an inflow tube fixedly attached to one end of said copper pipe forming a watertight connection. An outflow tube is fixedly attached to the other end of said copper pipe forming a watertight connection. In some embodiments the inflow and outflow tubes may be plastic. The inflow and outflow connections are located outside of the perimeter of said solar panel substantially near the said perimeter.

Water or other heat absorbing liquid is circulated through the inflow tube and into the copper pipe or container where the liquid absorbs heat from the light rays incident upon the copper pipe or container. The heated liquid exits the copper pipe or container through the outflow tube and may be directed to a device which converts the thermal energy within the liquid into electricity, particularly in cases of industrial and commercial applications. If the liquid to be heated is water, the heated water may be used for household purposes, in addition to industrial and commercial purposes.

The photo-voltaic cells of the panel are connected in a closed electrical circuit system with electrically conductive wires. The two electrically conductive leads to the panel's photo-voltaic cell system are attached to separate terminals of a battery into which electricity generated by the photo-voltaic cells flows.

Also, disclosed is a method of generating electricity and heat using a combined photo-voltaic and photo-thermal power generation device. The method includes forming a flexible photo-voltaic cell panel into the shape of a parabola. In some embodiments the panel is in the shape of a rectangle, square, or polygon of an even number of sides. In said embodiments the panel is curved in a manner wherein the parabola's X and Y coordinates are identical along its Z axis and the vertices of the parabola coincide with a line of symmetry. In other embodiments photo-voltaic cell panel comprises a parabolic cone, hemisphere, or other curved three dimensional shapes wherein the panel's X and Y coordinates change along the Z axis. A plurality of photo-voltaic cells is disposed in a grid pattern over the interior surface of the parabolic flexible photo-voltaic cell panel. A plurality of photo-reflective mirrors is fixedly attached in areas between the photo-voltaic cells or areas where photo-voltaic cells are absent. A straight copper pipe is positioned across the center of the parabolic solar panel perpendicular to the curvature of the parabola and along the parabola's focal line, in embodiments wherein the panel is in the shape of a rectangle, square, or polygon of at least four sides. In embodiments wherein said photo-voltaic cell panel comprises said parabolic cone, hemisphere, or other curved three dimensional shape, the container is positioned to coincide with the focal point of said photo-voltaic cell panel. Said copper pipe is supported and positioned by two rods, so that the light rays reflected off the parabola are focused on the copper pipe. A plastic inflow tube is fixedly attached to one end of said copper pipe forming a watertight connection. A plastic outflow tube is fixedly attached to the other end of said copper pipe forming a watertight connection. The photo-voltaic and photo-thermal power generation device is placed in an area exposed to sunlight to generate electricity and heat, wherein electricity produced by said photo-voltaic cells flows through electrically conductive wires to a battery where the electricity is stored. Water or other heat absorbing liquid is circulated through the inflow tube to the copper pipe where the fluid absorbs heat energy and then exits through the outflow tube. The energy laden fluid then may be used to generate electricity or is used directly for household purposes, such as if the fluid is water.

Embodiments of the disclosed technology will become clearer in view of the following discussion of the figures.

FIG. 1 shows a front elevation cross-sectional view of the parabolic solar panel. Depicted in FIG. 1 is a flexible photo-voltaic cell panel substrate formed into a parabola 10. A straight copper pipe 20 is positioned across the center of the parabolic solar panel perpendicular to the curvature of the parabola 10 and along the parabola's focal line. The copper pipe 20 is located and secured by two steel supports 22; the first of two is depicted in FIG. 1. The light rays reflected off the parabola 10 are focused on the copper pipe 20. A plastic outflow tube 24 is fixedly attached to one end of the copper pipe 20 forming a liquid impermeable connection. Electricity produced by the photo-voltaic cells on the interior surface of the parabolic solar panel 10 flows through an electrically conductive wire 32 to a battery 30 where the electricity is stored.

Figure 2:
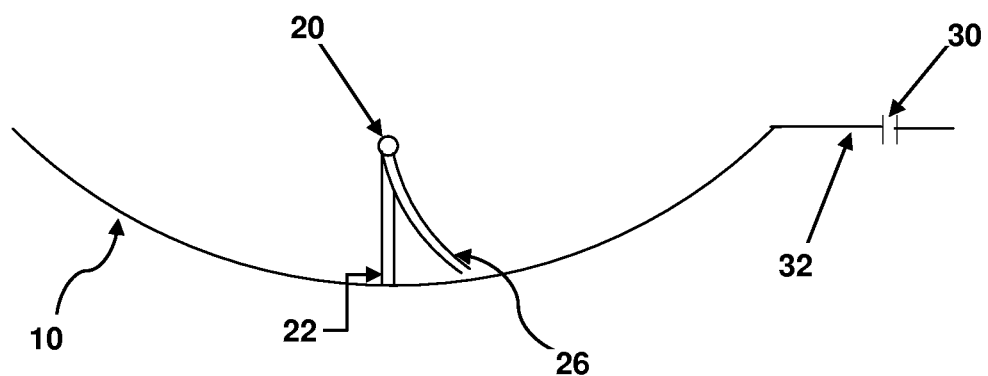
FIG. 2 shows a back elevation cross-sectional view of the parabolic photo-voltaic cell panel.

FIG. 2 shows a back elevation cross-sectional view of the parabolic solar panel. Depicted in FIG. 2 is a flexible substrate formed into a parabola 10. A straight copper pipe 20 is positioned across the center of the parabolic solar panel perpendicular to the curvature of the parabola 10 and along the parabola's focal line. The copper pipe 20 is located and secured by two steel supports 22; the second of two is depicted in FIG. 2. The light rays reflected off the parabola 10 are focused on the copper pipe 20. A plastic inflow tube 26 is fixedly attached to one end of the copper pipe 20 forming a liquid impermeable connection. Electricity produced by the photo-voltaic cells on the interior surface of the parabolic solar panel 10 flows through an electrically conductive wire 32 to a battery 30 where the electricity is stored.

Figure 3:
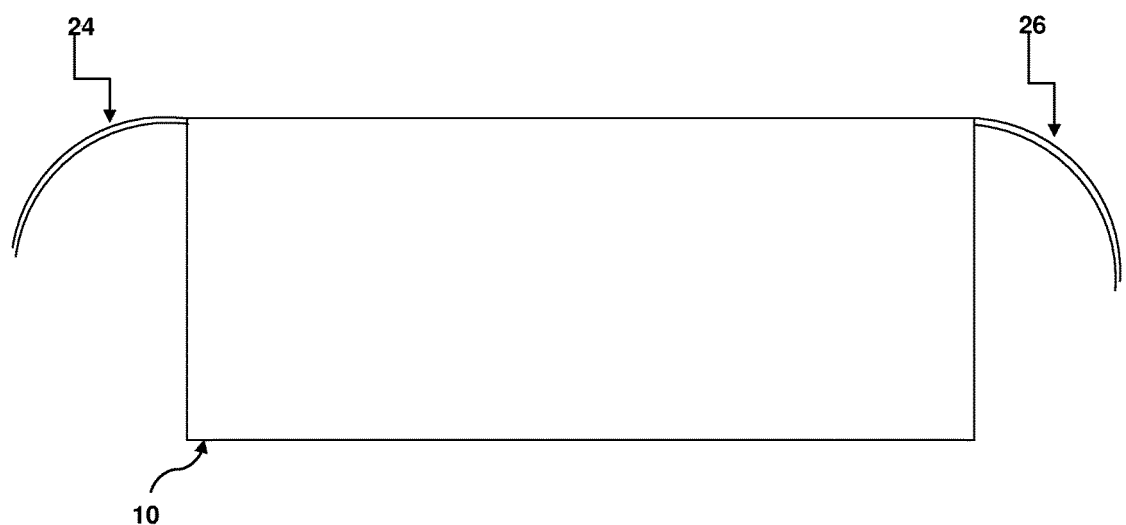
FIG. 3 shows a right side elevation view of the parabolic photo-voltaic cell panel.

FIG. 3 shows a right side elevation view of the parabolic solar panel. An inflow plastic tube 26 enters the perimeter of the parabolic solar panel 10 perpendicularly to the curvature of the panel 10. An outflow plastic tube exits the perimeter of the parabolic solar panel 10 perpendicularly to the curvature of the panel 10.

Figure 4:
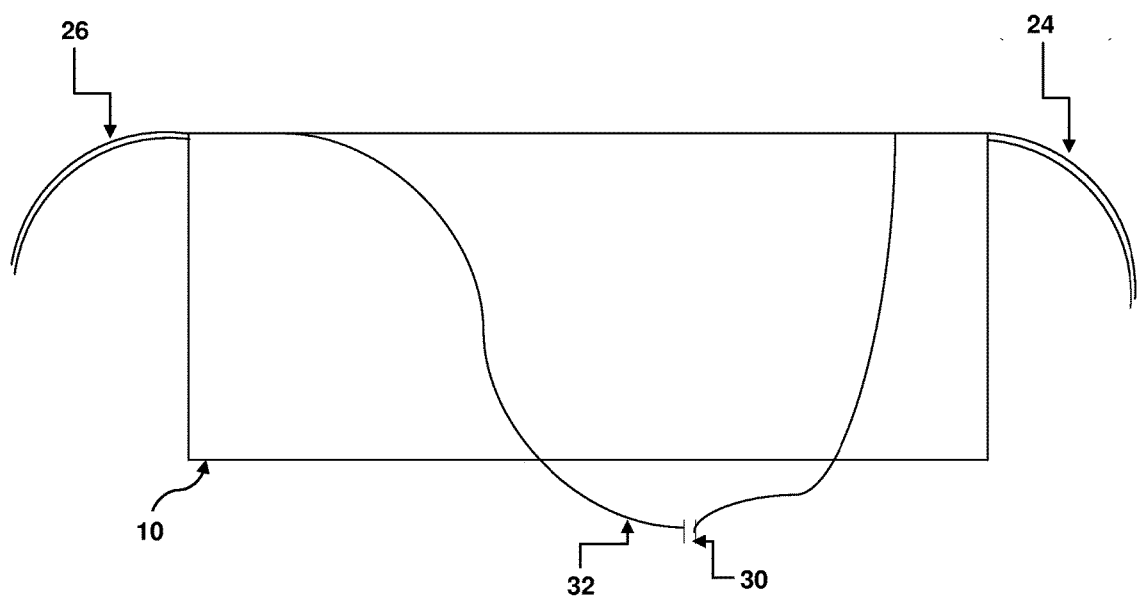
FIG. 4 shows a left side elevation view of the parabolic photo-voltaic cell panel.

FIG. 4 shows a left side elevation view of the parabolic solar panel. An inflow plastic tube 26 enters the perimeter of the parabolic solar panel 10 perpendicularly to the curvature of the panel 10. An outflow plastic tube exits the perimeter of the parabolic solar panel 10 perpendicularly to the curvature of the panel 10. Electrically conductive wires 32 carry electricity produced by the photo-voltaic cells of the parabolic solar panel 10 to and from a battery 30, where the electricity is stored.

Figure 5:
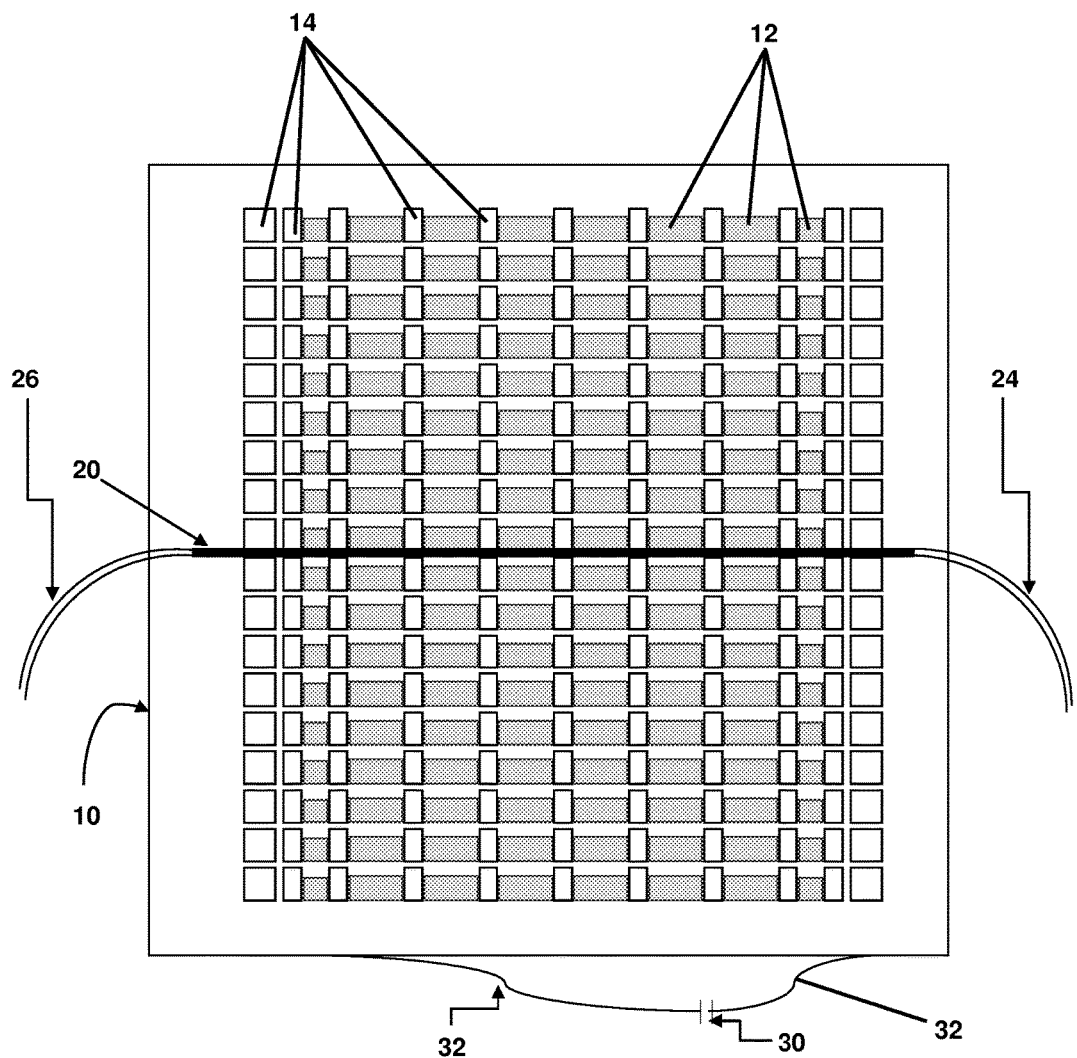
FIG. 5 shows a top view of the parabolic photo-voltaic cell panel.

FIG. 5 shows a top view of the parabolic solar panel. The copper pipe 20 runs across the center of the parabolic solar panel 10, perpendicular to the curvature of the panel 10. A plastic inflow tube 26 is fixedly attached to one end of the copper pipe 20, forming a liquid impermeable connection. A plastic outflow tube 24 is fixedly attached to the other end of the copper pipe 20, forming a liquid impermeable connection. Photo-voltaic cells 12 are disposed in a grid-like pattern over the interior of the parabolic solar panel 10. Photo-reflective mirrors 14 are disposed over the interior of the parabolic solar panel 10 in the areas not occupied by the photo-voltaic cells 12.

Figure 6:
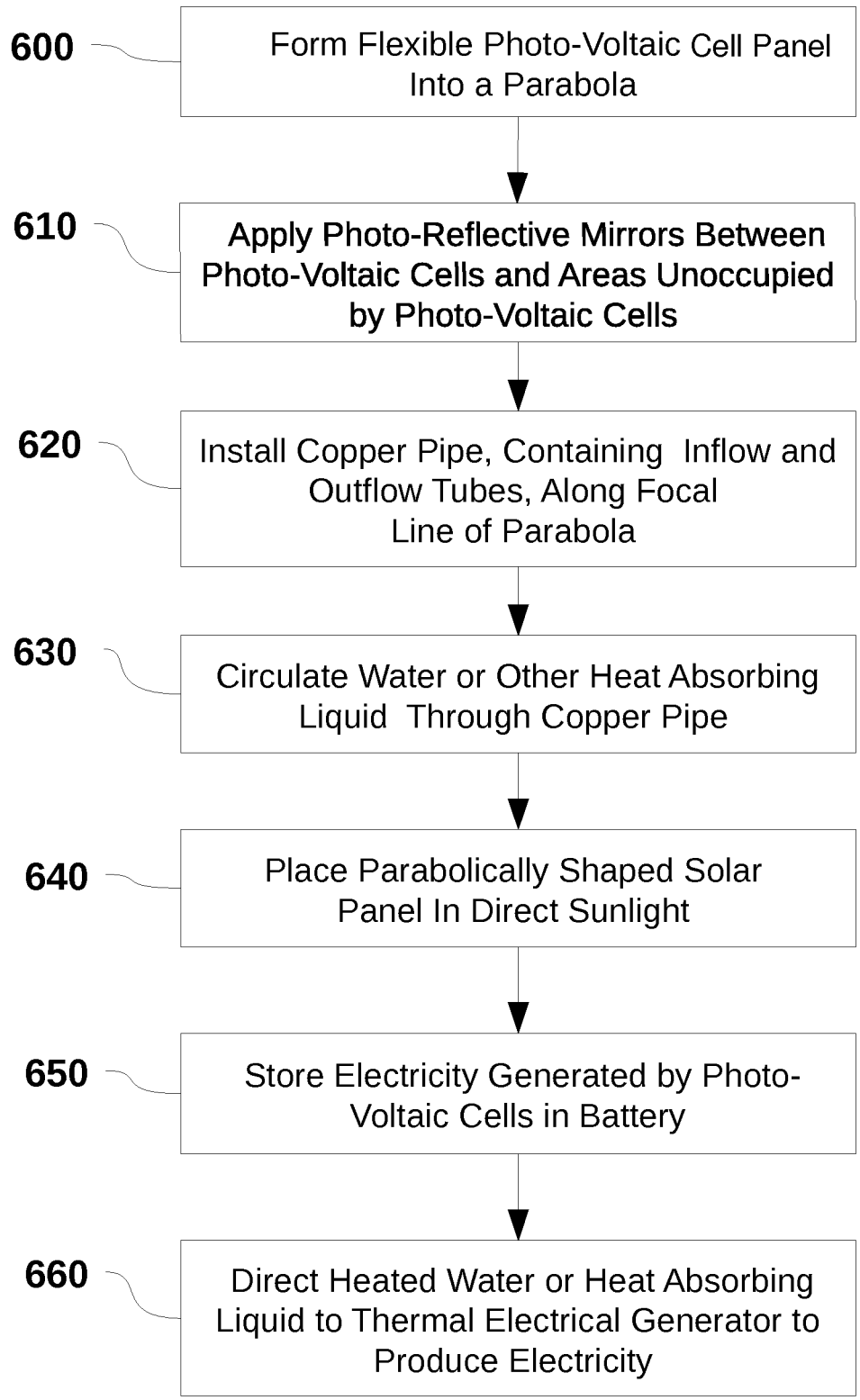
FIG. 6 is a flow chart depicting the method of using the photo-voltaic and photo-thermal power generation device.

FIG. 6 is a flow chart depicting the method of using the photo-voltaic and photo-thermal power generation device. In step 600 flexible photo-voltaic cells 12 are formed into a parabola. In step 610 photo-reflective mirrors 14 are inserted between the photo-voltaic cells 12 and areas on the interior of the panel unoccupied by said photo-voltaic cells 12. A copper pipe, containing inflow and outflow tubes, is installed along the focal line of the parabola in step 620. Next, in step 630, water or other heat absorbing liquid is circulated through the copper pipe. The parabolic shaped solar panel is placed in direct sunlight in step 640. In step 650 electricity produced by the photo-voltaic cells of the solar panel are stored in a battery. In step 660 heated water or heat absorbing liquid is directed to a device which converts the thermal energy in the heated liquid into electricity or the heated liquid is directly used for industrial, commercial, or residential purposes. One skilled in the art will recognize that an implementation of an actual photo-voltaic and photo-thermal electrical power generation device will contain other components as well, and that FIG. 5 is a high level representation of some of the components of such a device for illustrative purposes. It should also be understood by one skilled in the art that the method and devices depicted in FIGS. 1, 2, 3 4 and 6 may be implemented on a device such as is shown in FIG. 5.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

A sample parabolic solar panel was tested for performance and the results are given below:

The solar panel was placed in the sun and connected to the equipments. Then the water temperature, voltage generation, and current generation in the circuit were measured when the panel was flat. The same process was repeated after bending the panel into a parabolic shape at different angles. The location of the focus (or focal line) of the parabolic panel was calculated for different angles of bending. For this purpose the formula used was $f=x^2/4a$, where x=the diameter of the parabola divided by 2; a=the depth of the parabola. A sample calculation is given below:

$$f=x^2/4a=(26.75/2)^2/4(9.25)=4.83 \text{ inches}$$

The water temperature, voltage generation, and current generation after bending the solar panel were measured at different angles (0°–30°). Sample calculations of the saving in area are shown below:
1. The area covered by the flat solar panel
    =33.46 in×15.74 in
    =526.66 sq inches
2. The area covered by the solar panel (20 degrees bent)
    =31.59 inches×15.74 inches
    =497.23 sq inches
3. Total space saving
    =526.66−497.23
    =29.43 sq inches
4. Percent saving in space
    =((29.43)/497.23)*100
    =0.0591879 or 5.92% space saving for ONE panel of size 33.46 inches×15.74 inches It is estimated that as the bending angle of a solar panel increases or the curvature of the panel increases, its thermal efficiency increases and electrical efficiency decreases up to a certain extent. However, bending a panel beyond a certain angle will block more and more sunlight, which will reduce both, its thermal and electrical efficiencies.

The invention claimed is:

1. A photo-voltaic and photo-thermal power generation device comprising:
    a flexible substrate with a line of symmetry;
    said flexible substrate formed in the shape of a parabola, wherein the vertices of said parabola coincide with said line of symmetry;
    a plurality of flexible photo-voltaic cells fixedly attached to and disposed in a grid pattern over an interior surface of said parabola;
    a plurality of photo-reflective mirrors fixedly attached and disposed over said interior surface of said parabola in areas between said plurality of flexible photo-voltaic cells and areas unoccupied by photo-voltaic cells;
    a pipe positioned across the center of said parabolic solar panel perpendicular to the curvature of said parabola and along said parabola's focal line;
    an inflow tube fixedly attached to one end of said pipe forming a watertight connection;
    an outflow tube fixedly attached to the other end of said pipe forming a watertight connection,
    wherein the photo-voltaic cells and said photo-reflective mirrors are disposed alternatively in columns and rows over the interior of said flexible substrate.

2. The device of claim 1, wherein substantially all of said parabola is covered by either a photo-voltaic cell or a photo-reflective mirror.

3. The device of claim 1, wherein the photo-reflective mirrors cover less than half of said surface of said substrate and have a solar reflectance of at least 75%.

4. A photo-voltaic and photo-thermal power generation device comprising:
    a flexible substrate having a curved three dimensional shape wherein X and Y coordinates of said substrate change along the Z axis;
    a plurality of flexible photo-voltaic cells fixedly attached to and disposed in a grid pattern over the interior surface of said curved three dimensional shape;
    a plurality photo-reflective mirrors fixedly attached and disposed over the interior surface of said curved three dimensional shape in areas between the photo-voltaic cells and areas unoccupied by photo-voltaic cells;
    a container thereof positioned at the focal point of said curved three dimensional shape,
    such that said photo-voltaic cells and said photo-reflective mirrors are disposed alternatively in columns and rows of said grid pattern over said interior surface of said curved three dimensional shape.

5. The device of claim 4, wherein an inflow tube is fixedly attached to one end of said container and an outflow tube is fixedly attached to the other end of said container.

6. The device of claim 5, wherein said attachments between said container and said inflow and outflow tubes form a watertight connection.

7. A method of manufacturing a combined photo-voltaic and photo-thermal power generation device comprising the steps of:
    forming a flexible substrate in geometric shape through which a line of symmetry may be drawn,
    forming said flexible substrate in the shape of a parabola, wherein the vertices of said parabola coincide with a line of symmetry;
    fixedly attaching and disposing a plurality of flexible photo-voltaic cells in a grid pattern over the interior surface of said parabola;
    fixedly attaching and disposing a plurality of photo-reflective mirrors over the interior surface of said parabola in areas between the photo-voltaic cells and areas unoccupied by photo-voltaic cells, such that said photo-voltaic cells and said photo-reflective mirrors are disposed alternatively in columns and rows of said grid pattern;
    positioning a pipe across the center of said parabola perpendicular to the curvature of the parabola and along said parabola's focal line;
    fixedly attaching an inflow tube to one end of said pipe forming a watertight connection;
    fixedly attached an outflow tube to the other end of said pipe forming a watertight connection.

8. A method of using the device of claim 4, comprising the steps of:
    utilizing spaces around photo-voltaic cells of said solar panels by populating said spaces with photo-reflective mirrors;
    capturing additional solar energy reflected off said photo-reflective mirrors towards said container;
    converting said additional solar energy into heat energy for use in industrial, commercial, and residential applications.

9. The method of claim 8, wherein said flexible substrate is bent into a form of a paraboloid, and improving the ratio of the installed area of a solar panel to the effective area of the solar panel exposed to the sun from the existing 1:1 for rigid, rectangular solar panels to 1:1.059 for flexible, curved solar panels, while comparatively decreasing the installed area at least 5%.

* * * * *